United States Patent [19]

Brännström

[11] Patent Number: 4,802,796
[45] Date of Patent: Feb. 7, 1989

[54] PRESSURE-REDUCING DEVICE FOR PARTICULATE MATERIAL

[75] Inventor: Roine Brännström, Finspong, Sweden

[73] Assignee: ASEA-Stal AB, Finspong, Sweden

[21] Appl. No.: 104,590

[22] Filed: Sep. 29, 1987

Related U.S. Application Data

[63] Continuation of Ser. No. 819,331, Jan. 16, 1986, abandoned.

[30] Foreign Application Priority Data

Jan. 28, 1985 [SE] Sweden .............................. 8500378

[51] Int. Cl.[4] ............................................ B65G 53/04
[52] U.S. Cl. ................................. 406/141; 406/138; 406/144; 406/168; 406/195; 406/197
[58] Field of Search .................... 406/93–95, 406/138, 141–144, 146, 168, 174, 191, 193–195, 197; 138/42, 44

[56] References Cited

U.S. PATENT DOCUMENTS

| | | | |
|---|---|---|---|
| 610,066 | 8/1898 | Kuser | 406/193 X |
| 914,105 | 3/1909 | Boland | 406/143 X |
| 2,606,097 | 8/1952 | Goodson et al. | 406/143 X |
| 2,610,093 | 9/1952 | Bergman | 406/143 |
| 2,693,395 | 11/1954 | Berg | 406/94 X |
| 2,901,421 | 8/1959 | Bourguet et al. | 406/143 X |
| 4,619,562 | 10/1986 | Brännström | 406/193 X |
| 4,699,210 | 10/1987 | Brännström | 406/193 X |

FOREIGN PATENT DOCUMENTS

| | | |
|---|---|---|
| 112557 | 11/1964 | Czechoslovakia . |
| 108505 | 5/1984 | European Pat. Off. . |
| 1152948 | 8/1963 | Fed. Rep. of Germany . |

OTHER PUBLICATIONS

Hanway et al., "Discharge and Handling of Solids from Pressurized Fluidized-Bed Combustors", 10-1982, pp. 34-35, Argonne National Laboratory, Argonne, Ill.

Primary Examiner—Andres Kashnikow
Assistant Examiner—Mary Beth O. Jones
Attorney, Agent, or Firm—Pollock, Vande Sande & Priddy

[57] ABSTRACT

A pressure-reducing device in a pneumatic transport system for particulate material having a first and a second transport channel which are arranged so that, at the transition between the two channels, the gas/particulate flow is bent through 180°. After the bend, a throttling means is arranged. The throttling means consists of an annular nozzle, the inlet side thereof being rounded with an arcuate profile in radial section. The pressure-reducing device may be included in a transportation system for feeding particulate material out from a pressurized container to a container under a lower pressure, for example for removing dust from a dust separator in a PFBC plant to a collecting container.

12 Claims, 6 Drawing Sheets

PRESSURE-REDUCING DEVICE FOR PARTICULATE MATERIAL

This application is a continuation of application Ser. No. 819,331, filed Jan. 16, 1986, now abandoned.

TECHNICAL FIELD

The invention relates to a pressure-reducing device in a pneumatic transport system, comprising a first channel and a second channel which are arranged such that, at the transition between the first and the second channels, the flow is bent through an angle of about 180°. It is particularly intended for transport systems employed to pass particulate material from a first container, which is subjected to a high pressure, to a second container, which is subjected to a lower pressure, for example a transport system for the continuous removal of dust from a dust separator, used to clean the combustion gases issuing from a PFBC (pressurised fluid bed combustion) plant, to a collecting container for the separated dust. A pressure-reducing device according to the invention can also be used for other purposes, for example as a unit in a sand-blasting plant.

PRIOR ART

A pneumatic transport device for conveying a particulate material from a first container, which is subjected to high pressure, to a second container, which is subjected to a lower pressure, is described in detail in ASEA STAL AB's European Patent Application No. 0 108 505. This patent application shows the transport device applied to a PFBC plant for the removal of separated dust from series-connected separators, for example cyclones, in a pressure vessel to a container outside the pressure vessel. The transport device also comprises a tube system in which the gas/dust flow is bent repeatedly in order to successively reduce the pressure to atmospheric level. The pressure reduction is performed in a number of stages. The transport device is made in the form of a cooler and is placed in the pressure vessel so that it is cooled by the combustion air and thereby preheats the same, thus recovering a high proportion of the thermal energy in the transport gas and the dust.

The pressure in the pressure vessel may amount to 1.0–2 MPa (10–20 bar). The pressure varies with the load, usually between about 0.3 and 1.5 MPa (3–15 bar). During its passage through the series-connected cyclones, the pressure in the gas drops somewhat, thus obtaining different pressures in the different cyclones. This must be taken into account when designing the dust discharge system so that an acceptable transport capacity can be maintained at different loads and pressures and so that the flow of gas from an upstream cyclone to a downstream cyclone through the discharge system is prevented. The first problem can be solved by the provision of switching devices, such as those disclosed in pending U.S. Pat. No. 4,619,562. With these switching devices, the flow path through the discharge system is changed, so that a differently large part of the number of tube parts are utilized. The second problem can be solved by connecting the different series-connected cyclones at different points in the tube package of the discharge system, as shown in the previously mentioned European Application No. 0 108 505.

OBJECTS OF THE INVENTION

One object of the present invention is to provide a pressure-reducing device with a large throttling ability for transport devices for pneumatic transportation of particulate material where a large pressure drop across the transport device can be expected to arise.

Another object of the present invention is to provide a pressure-reducing device with an extended service life.

A still further object of the present invention is to provide a pneumatic transport device which operates satisfactorily even in the event of considerable variations in pressure difference occurring between a delivering and a receiving container. In this way, a simplified dust discharge system can be obtained in a PFBC plant, which operates satisfactorily at varying loads in spite of the fact that the pressure existing in the pressure vessel varies greatly with changes in the thermal load on the plant.

SUMMARY OF THE INVENTION

According to the present invention these objects are achieved by introducing, near the dust gas outlet from the dust separator, a pressure-reducing device which has such a large throttling ability that the pressure existing after throttling is less than the pressure in the lowermost downstream dust separator in the row of series-connected dust separators. The invention thus prevents a harmful gas stream developing from an upstream dust separator to a downstream dust separator in the discharge system when connecting all the series-connected dust separators to a common conveying pipe.

A suitable pressure drop in the pressure-reducing device is 0.05–0.2 MPa (0.5–2 bar), that is, considerably greater than the pressure drop at a bend in the cooling portion. The throttling means at the different separators suitably have different throttling abilities, an upstream dust separator being provided with a pressure-reducing device with a greater throttling ability than a pressure-reducing device close to a downstream dust separator. This makes it possible to connect all the separators to the same point in the cooling portion without the risk of overflow from an upstream dust separator to a downstream dust separator, via the cyclone legs.

It may also be appropriate to locate, between the cooling portion and the receiving container, a pressure-reducing device with a large throttling ability and a by-pass line, disposed in parallel with the pressure-reducing device and provided with a valve, in order to obtain, at low load and upon start-up, suitable flow conditions in the cooling portion in the situation where the cooling portion has been dimensioned having regard to full load conditions. The manufacture of the cooling portion can also be simplified. All the tube parts and end pieces required for the pressure-reducing devices may be identical which results in low manufacturing costs.

At high pressures and full load operation, the gas/material flow passes through all the pressure-reducing devices provided. At lower pressures (e.g. during partial load operation and during start-up) the gas/material flow can be directed through one or more of the bypass lines to avoid one or more of the pressure-reducing devices, in order to obtain sufficiently high transport speed in the cooled pressure-reducing part. The size of the cooled part is dependent on the extent to which it is desired to recover the heat content of the dust and the transport air for pre-heating the combustion air.

In a device according to the present invention, the gas flow throttling means is provided downstream of the flow bending means. This gas flow throttling means can consist of a nozzle at the inlet to the second transport channel. The opening area $A_1$ in the nozzle is desirably considerably smaller than the area $A_2$ immediately downstream of the nozzle, in the second channel. The area ratio may vary within wide limits but preferably should be greater than 10:1 and is desirably between 100:1 and 600:1.

The two channels of the pressure-reducing device are suitably coaxial and may comprise two cylinders, the first channel being wider and surrounding the second, narrower channel. The inner cylinder, which forms the narrower channel, has a limited length. At one end it is connected to the nozzle, and at its other end it is closed and connected to a radially oriented downstream transport channel between its mid-point and the nozzle. The closed end forms an appendix-like blind space. A pressure reducing device according to the invention can also be utilized as a nozzle for use with sand blasting equipment.

BRIEF DESCRIPTION OF THE DRAWINGS

The invention will now be described in greater detail, by way of example, with reference to the accompanying drawings, wherein.

DESCRITPION OF PREFERRED EMBODIMENTS

Figures 1, 2, 4:
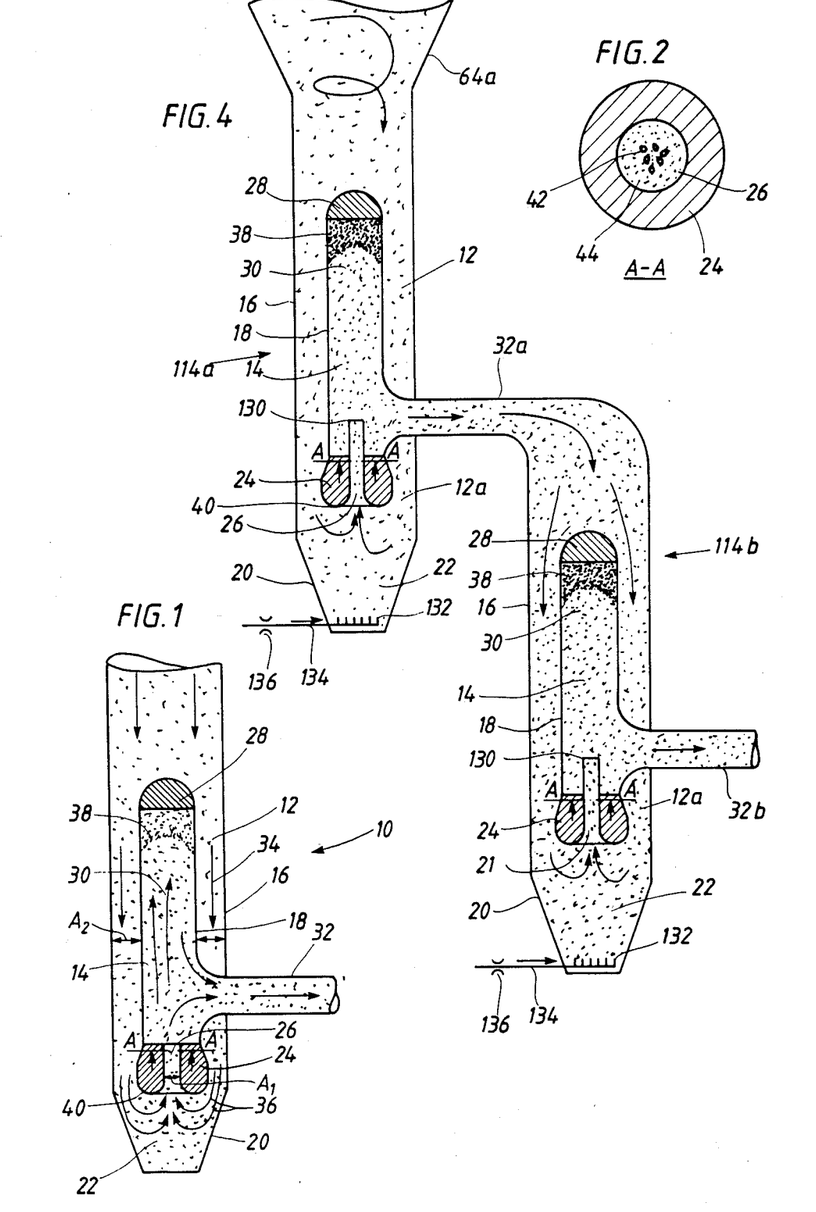
FIG. 1 shows schematically a vertical section through a pressure-reducing device.
FIG. 2 shows a section on the lines A—A in FIGS. 1 and 4.
FIG. 4 shows a pressure reducing device adjacent to a cyclone outlet.

A pressure-reducing device 10 comprises a first wider transport channel 12 and a second narrower transport channel 14, that is, an upstream transport channel with a larger outside diameter than a downstream transport channel. The pressure-reducing device 10 comprises two concentric cylinders 16 and 18, respectively. The cylinder 16 is closed at one end 20. The cylinder 18 is located in the cylinder 16 near the closed end 20 thereof, so as to form a space 22 near the closed end. At the end of the cylinder 18, facing the space 22, a nozzle 24 is provided with an opening 26 having a cross-sectional area $A_1$, which is considerably smaller than the area $A_2$ in the channel 14 into which the opening 26 leads. Suitably, the ratio $A_2/A_1$ is greater than 10 and preferably lies between 100 and 600. The opposite end of the cylinder 18 is closed by a plug 28 to form a blind space 30. The plug 28 is constructed so as to be resistant to erosion from incoming particulate material. The cylinder 18 is connected to a radial outlet tube 32, suitably located close to the nozzle 24. Particulate material flows in the annular channel 12, as shown by the arrows 34, down into the space 22 where it is bent through 180°, as shown by the arrows 36, on its way into the opening 26. Solid material is thrown up into the blind space 30, at the upper end of which a cushion 38 of material is formed, which protects the plug 28 from erosion. Particulate material and transport gas leave the channel 14 through the tube 32.

As shown in FIG. 1, the inlet side of the nozzle 24, which faces the space 22, is shaped so that its generatrix 40 is arched in radial section. This generatrix 40 may, for example, consist of part of an ellipse or a circle. By employing a suitable arcuate shape for the nozzle adjacent to its inlet, such flow conditions are obtained that the particle concentration is lower in the peripheral part of the nozzle opening 26 than in its central part. In addition, the larger particles 42 (see FIG. 2), which are the particles most likely to cause erosion, are concentrated in the central part of the opening 26, whereas smaller particles 44 will flow to a greater extent in the outer part of the opening. This effect is achieved as a consequence of the 180° bend and a suitable shaping of the generatrix 40. Because of their small mass and inertia, little energy is required for bending small particles 44, so these will, to a large extent, be rapidly deflected and therefore will flow through the opening 26 close to the surface of the nozzle 24. Because of their larger mass and inertia, more energy is required to deflect the larger particles 42, so these will trace an arc of greater radius in the space 22 and therefore will, to a greater extent, flow through the opening 26 closer to its central axis. When the inlet side of the nozzle is suitably shaped, it has been found that hardly any erosion at all occurs in the nozzle 24. A coating of fine particles may even become deposited on the inlet side of the opening 26.

Since the opening 26 discharges material into the channel 14 and the latter has a much larger cross-section than the opening 26, the pressure loss in flowing through the nozzle will be very large and the desired pressure drop can be obtained with one or a few series-connected pressure-reducing devices. Pressure drops exceeding 0.1 MPa (1 bar) can be achieved in a pressure-reducing device of a suitable design.

Figure 3:
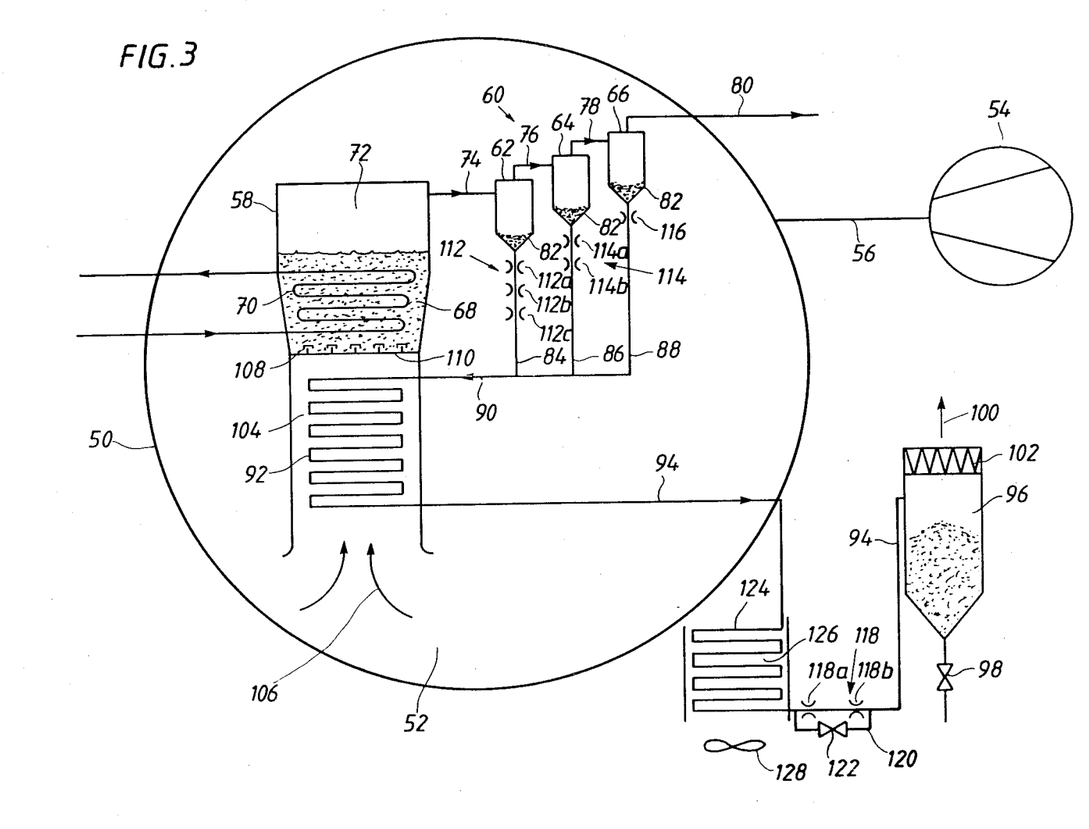
FIG. 3 shows schematically a PFBC plant with a throttle means in a dust discharge system.

In FIG. 3, 50 designates a container which is under pressure. The space 52 defined therein is supplied with compressed air from a compressor 54, via a conduit 56. The container 50 accommodates a combustion chamber 58 and a number of parallel-connected groups 60 of series-connected dust separators, for example cyclones, 62, 64 and 66, for the separation of dust from the combustion gases leaving the combustion chamber 58. FIG. 3 shows only one group of such separators but more than one group could be provided in the container 50. The lower part of the combustion chamber 58 includes a fluidizable bed 68 of a granular material and a tube bundle 70 for cooling the bed 68 and for generating steam for a steam turbine (not shown). The combustion gases leaving the bed 68 accumulate in a plenum space 72 above the bed 68 and are passed through a conduit 74 to the first cyclone 62 and thereafter, via further conduits 76 and 78, to the series-connected cyclones 64 and 66. Dust (ashes) 82 is separated in the cyclones 62, 64 and 66, and the cleaned gases leave the cyclone 66, through a conduit 80, to a gas turbine (not shown). This gas turbine can drive the compressor 54 and/or a generator (also not shown).

The dust 82 separated in the cyclones is continuously transported in a pneumatic transportation system. This system comprises conduits 84, 86, 88, a common collecting conduit 90 which is connected to a cooler 92 for cooling the dust and its transport gas, a conduit 94, and a container 96 where the dust is separated from the transport gas. The container 96 is situated outside the pressure vessel 50. Dust is discharged by a valve 98. Transport 100 is removed, through a filter 102, to the atmosphere. The cooler 92 may be designed as the transport device according to the above-mentioned European Application No. 0 108 505, where the pressure is successively reduced by repeatedly diverting the gas/dust flow between a number of series-connected tube parts. The cooler 92 may be placed in a channel 104 which conducts combustion air 106 from the space 52 to nozzles 108 in a bottom 110 of the combustion chamber 58.

FIG. 3 shows three series-connected pressure-reducing devices 112a, 112b and 112c in the conduit 84, two series-connected pressure-reducing devices 114a and 114b in the conduit 86, one pressure-reducing device 116 in the conduit 88, and two pressure-reducing devices 118a and 118b in the conduit 94. The total throttling ability may be varied by constructing the various pressure-reducing devices with different throttling ability and/or by series-connecting different numbers of pressure-reducing devices 118 having equal or different throttling ability. A bypass conduit 120 with a valve 122 may be provided in parallel to the pressure-reducing device 118. The pressure-reducing device 118 and the bypass conduit 120 with the valve 122 may be located inside the pressure vessel 50 or, as shown in FIG. 3, outside this vessel. Outside the pressure vessel 50, a second cooler 124 located in a channel 126 may be provided, through which cooling air is injected by means of a fan 128. This latter cooler 124 may replace the pressure-reducing devices 118a, 118b. The second cooler 124 may be used when it is not possible to obtain sufficient cooling by means of the combustion air in the channel 104, to reduce the temperature of the transport gas, prior to its entry into the container 96, to no more than 150° C.

The pressure-reducing devices 112, 114 and 116 provided in the container 50 of the PFBC plant are designed in essentially the same way as the pressure-reducing device 10 shown in FIG. 1. The cylinder 16 of the pressure-reducing device 114a is, as shown in FIG. 4, directly connected to a lower conical part 64a of the cyclone 64. The nozzle 24 has a larger outer diameter than the cylinder 18 so that a constriction arises in the surrounding annular channel portion 12a. This can affect the flow at the nozzle inlet. Further, in this embodiment, the nozzle 24 has a greater axial extension than in the device shown in FIG. 1 by adding a tube 130, so that a flow path with a constant cross-section and a considerable length is provided. In this way, a smaller change of the pressure reduction effect at a decreasing pressure can be achieved, since the acceleration distance of the particles will be longer in the event of a reduced volume flow of the transport gas. Further, nozzles 132 are provided in the lower part of the space 22, through which nozzles gas may be supplied to the space 22 to fluidize any downfalling dust which has been separated in the cyclone 64. For fluidization, air from the space 52 can be utilized without the need for a pump, since the pressure in the space 52 exceeds the pressure in the space 22. The air for the nozzles 132 is supplied through a conduit 134. For determining the air flow through the conduit 134, an adjustable throttle means 136 is provided.

The dust/gas flow from the pressure-reducing device 114a is led to the pressure-reducing device 114b through an outlet conduit 32a. The dust/gas flow leaves the pressure-reducing device 114b through an outlet tube 32b. This is connected to the conduit 86.

A further pressure-reducing device may also be included in a feeding-out conduit for bed material from the fluidized bed 68 in a PFBC power plant. Upstream of this further pressure-reducing device there is suitably placed a cooler, in which the bed material is cooled prior to passage through valves in the conveying pipe.

Figures 5, 6:
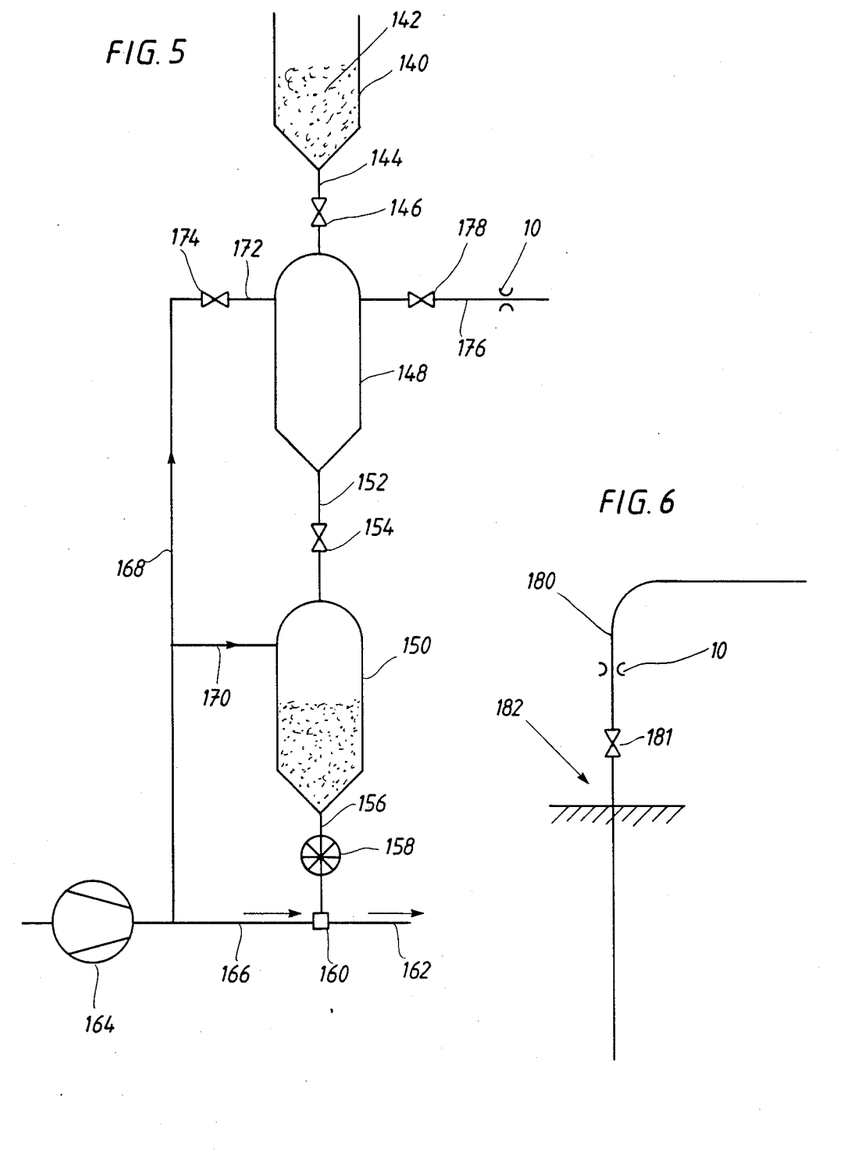
FIG. 5 shows the pressure reducing device as an outlet for contaminated gas from a lock hopper container.
FIG. 6 shows the pressure reducing device utilized for reduction of the gas pressure in the case of a source of natural gas.

In a lock hopper system shown in FIG. 5, there is a first container 140 containing, for example, crushed coal 142. The container 140 is constantly held under atmospheric pressure. It is connected through a conduit 144 provided with a valve 146, to a container 148. The container 148, in its turn, communicates with a container 150 through a conduit 152 provided with a valve 154. The container 150 is connected, through a conduit 156 containing a rotary feeder 158, to an ejector 160 in a fuel conveying pipe 162. The ejector 160 is supplied with transport gas from a compressor 164 through a conduit 166. The containers 148 and 150 communicate with the gas conduit 166 through conduits 168, 170 and 168, 172, respectively. The conduit 172 includes a valve 174. The container 148 can be connected to atmosphere through a conduit 176 provided with a valve 178 and a pressure-reducing device 10 of the kind shown in FIG. 1. When material has been transferred from the container 140 to the container 148 at atmospheric pressure, the valves 146 and 178 are closed and the valve 174 is opened, thus pressurizing the container 148. The valve 154 is then opened and the material is transferred to the container 150, after which the valve 154 can be closed again. Thereafter, the pressure in the container 148 is reduced by opening the valve 178. The flow is throttled in the pressure-reducing device 10 so that suitable outflow conditions are obtained. Since the pressure-reducing device 10 is provided in the outlet conduit 176, the valve 178 may be an on-off valve, which is most advantageous since the gas leaving the container 148 will be contaminated by solid abrasive particles. Because of the pressure-reducing device 10, the valve 178 can be formed with a large flow area, resulting in a low velocity of flow and, hence, a small erosion due to the solid particles in the gas.

FIG. 6 shows a pressure-reducing device 10 of the kind shown in FIG. 1 placed downstream of a valve 181 in a conduit 180 from a natural gas source 182. The pressure of the gas in the gas source 182 may amount to several hundred bar, and the gas pressure needs to be reduced before the gas is released into a conveying pipe. A pressure-reducing device according to the invention is extremely suitable for this purpose, since it is very insensitive to solid impurities which may be entrained in the gas. Also in this case, of course, a plurality of pressure-reducing devices may be connected in series, in the manner shown in FIG. 4.

Figure 7:
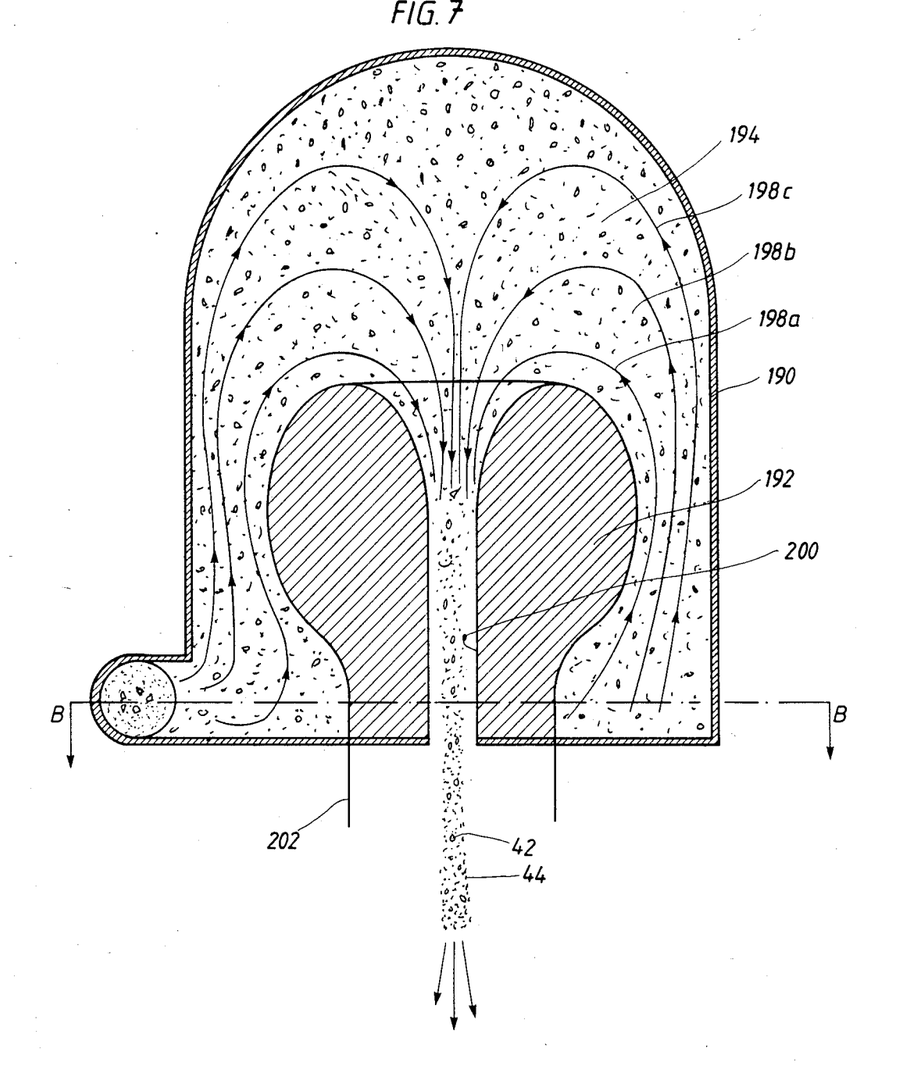
FIGS. 7 and 8 show schematic sectional views of a blast nozzle utilizing the pressure-reducing valve.
Figure 8:
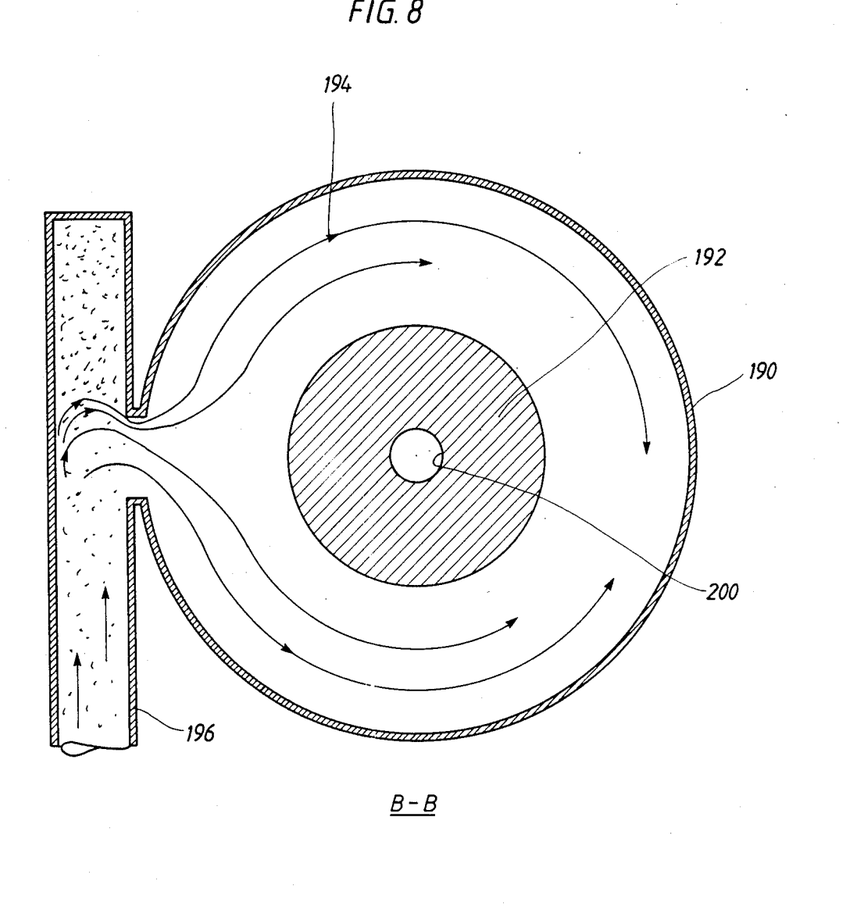

A pressure-reducing device according to the invention can also be used in a blast nozzle for accelerating gas-entrained particulate blast material (e.g. sand) to high speed. One form of construction for such a device is shown in FIGS. 7 and 8. A housing 190 accommodates a nozzle 192. Compressed air and blast material are supplied to a space 194 within the housing 190 through a conduit 196. In the space 194, the material/gas flow is diverted, as shown by the paths 198a, 198b and 198c in FIG. 7. Small particles with a small mass require little power to be deflected and follow an inner path 198a. Heavier particles require more power to deflect and follow a middle path 198b, and the heaviest particles follow an outer path 198c. At the nozzle opening, shown at 200 in FIGS. 7 and 8, the larger, heavier particles (shown at 42 in FIG. 7) will to a large extent travel centrally through the opening 200, and the lighter particles (shown at 44 in FIG. 7) will, to a large extent, pass through the peripheral region of the opening 200. Around the orifice of the nozzle 192, a sleeve 202 may be arranged (see FIG. 7) which has a considerably larger diameter than that of the opening 200. Since the main part of the blast material passes through the nozzle without contacting its walls, the wear induced by the blast material is insignificant and the nozzle 192 will have a much longer life than blast nozzles presently in use. A uniform blasting effect can be obtained over a long period of time. This is an extremely significant advantage in the case of automated blasting carried out by means of a robot.

Figure 9:
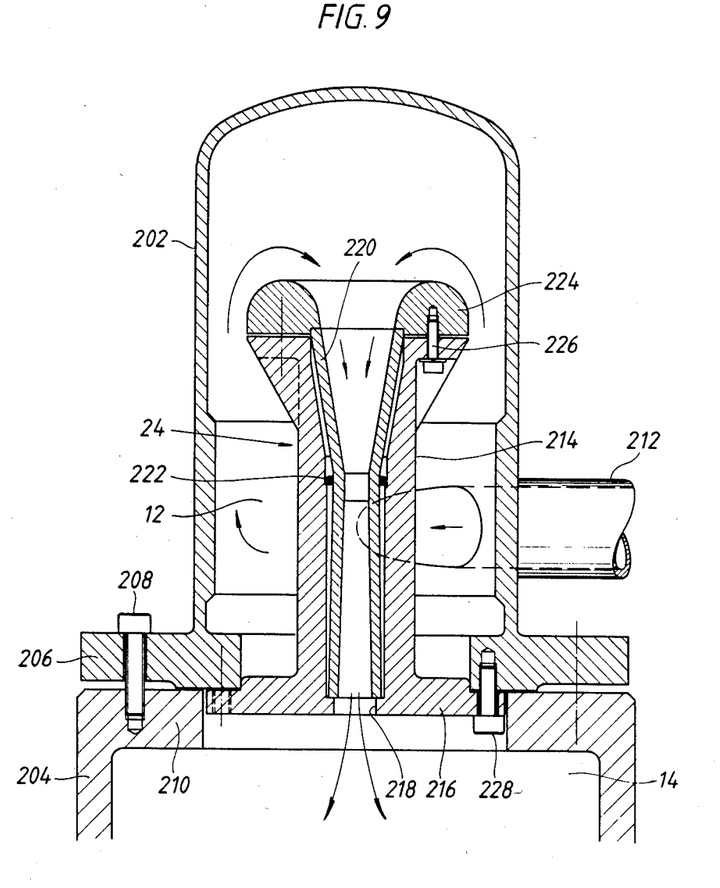
FIG. 9 shows a preferred embodiment of the pressure reducing valve.

FIG. 9 shows a preferred practical embodiment of a pressure-reducing device according to the present invention. The first channel 12 is here defined between a cup-shaped housing 202 and a nozzle 24 composed of several parts, and the second channel 14 is formed by a tube 204. The first channel 12 is thus annular. The housing 202 is formed with a flange 206 and is joined to a flange 210 of the tube 204 by means of bolts 208 (only one of which is shown). A gas/particle flow is supplied to the pressure-reducing device of FIG. 9 through a tube 212 which is tangentially connected to the housing 202. The nozzle 24 is built up of a sleeve 214, with an outer flange 216 and an inner flange 218 at one end, a tube 220 extending down into the sleeve 214, tube 220 resting on the flange 218 and being sealed against the sleeve 214 by an O-ring 222, and a ring 224 which is joined to the sleeve 214 by a number of bolts 226 (only one of which is shown) and fixing the nozzle 220 in the sleeve 214. The nozzle 24 is joined to the housing 202 by the flange 216 of the sleeve 214 and a ring of bolts 228 (only one of which is shown).

The embodiment shown in FIG. 9 is a very favourable design. The tube 220 and the ring 224 of the nozzle, which are subjected to the greatest stresses, can be made from material with wear resistance, for example from a metal alloy having good wear resistance, from a hard metal, for example a cemented carbide or from a ceramic material. The use of expensive material is restricted, and the parts which are exposed to the greatest wear can easily be replaced when required. This embodiment is advantageous from the standpoint of manufacturing cost as well as service life.

Many modifications can be made to the embodiments described herein without departing from the scope of the invention as defined in the following claims.

I claim:

1. Fluid transport apparatus for discharging particulate material with a fluid from a first chamber subjected to a high internal pressure to a second chamber having a significantly lower pressure comprising:
    a first conduit for transporting said material from said first chamber, said first conduit having a closed downstream end;
    a second conduit positioned within and spaced from the inner surface of said first conduit with an open end at its upstream end which faces the downstream end of the first conduit, said second conduit defining at its inlet end a smoothly decreasing cross-sectional area in its downstream direction and a minimum cross-sectional area which is substantially less than the cross-sectional area of the space between said first and second conduits;
    said second chamber receiving the output of said particulate material and said fluid as it emerges from said second conduit and having a cross-sectional area which is at least ten times greater than said minimum cross-sectional area of said second conduit;
    whereby the reversal in direction of flow of the particulate material before it enters said second conduit and its subsequent emergence into said second chamber causes a substantial portion of the particulate material, and especially the particles thereof which are of greater mass, to pass through the central part of said second conduit particularly adjacent its upstream end to thereby reduce significantly the wear at the entrance to said second conduit.

2. The apparatus of claim 1 in which said first and second conduits are concentric.

3. The apparatus of claim 1 in which said first and second conduits are each of circular cross-section.

4. The apparatus of claim 1 in which the inlet end of said second conduit is rounded with a generatrix which is arcuate in radial section.

5. The apparatus of claim 1 in which the cross-sectional area of the second chamber is at least 100 to 600 times greater than the minimum cross-sectional area of said second conduit.

6. The apparatus of claim 1 in which said second chamber comprises a further conduit which is coaxial with said second conduit and has an enclosed end opposing the end which joins with said second conduit.

7. The apparatus of claim 6 in which an outlet tube extends laterally outwardly from said further conduit comprising said second chamber.

8. The apparatus of claim 1 in which said first chamber comprises a source of natural gas under high pressure.

9. The apparatus of claim 1 in which said first chamber comprises a source of a gas-entrained particulate blast material such as sand, whereby said particulate blast materially is greatly accelerated in said second conduit before emerging into an outlet nozzle comprising said second chamber.

10. The apparatus of claim 1 in which said second conduit comprises an outer housing and an inner detachable nozzle portion, said inner detachable portion being formed of a material having a high erosion resistance.

11. A pneumatic transport system according to claim 1 wherein said first chamber is formed by a dust separator in a dust removal system of a PFBC plant and the second chamber is formed by a dust collecting container.

12. A method for conveying a mixture of a particulate material with a fluid from a first chamber where the fluid is at high pressure to a second chamber where the fluid is at a pressure at least 0.5 bar less than that in said first chamber comprising the steps of:
    while transporting said mixture with the fluid at high pressure through a first conduit, substantially altering the direction of flow of said mixture;
    thereafter conveying said mixture at a high velocity through a second conduit, positioned within and spaced from the inner surface of said first conduit, and having a minimum cross-sectional area which is substantially less than the space between said first and second conduits; and finally conveying the mixture into the second chamber whose cross-sectional area is at least ten times greater than the minimum cross-sectional area of the second conduit;

whereby the substantial altering of the direction of flow of the mixture with the fluid at high pressure prior to the conveying of the mixture through the second conduit and thence to the second chamber significantly reduces the wear on the entrance to said second conduit.

* * * * *